United States Patent [19]
Bullmer et al.

[11] Patent Number: 5,462,499
[45] Date of Patent: Oct. 31, 1995

[54] METHOD FOR CONTROLLING THE SHIFTING COMFORT IN MOTOR VEHICLES HAVING AN AUTOMATIC TRANSMISSION

[75] Inventors: Wolfgang Bullmer, Bietigheim-Bissingen; Kurt Neuffer, Stuttgart, both of Germany

[73] Assignee: Robert Bosch GmbH, Stuttgart, Germany

[21] Appl. No.: 149,955

[22] Filed: Nov. 10, 1993

[30] Foreign Application Priority Data

Nov. 10, 1992 [DE] Germany .......................... 42 37 878.8

[51] Int. Cl.⁶ ................................................. F16H 59/48
[52] U.S. Cl. ........................... 477/120; 477/109; 477/904
[58] Field of Search ................................ 477/109, 120, 477/904

[56] References Cited

U.S. PATENT DOCUMENTS

| | | | |
|---|---|---|---|
| 4,172,505 | 10/1979 | Rabus et al. | 477/120 |
| 4,679,145 | 7/1987 | Beeck et al. | 364/424.1 |
| 5,282,401 | 2/1994 | Hebbale et al. | 477/120 |

FOREIGN PATENT DOCUMENTS

| | | |
|---|---|---|
| 2030245 | 4/1980 | United Kingdom . |
| 1579317 | 11/1980 | United Kingdom . |
| WO92/09448 | 6/1992 | WIPO . |

OTHER PUBLICATIONS

"Bosch Technische Berichte", vol. 7 (1983), No. 4, pp. 160 to 187.

*Primary Examiner*—Charles A. Marmor
*Assistant Examiner*—Sherry Estremsky
*Attorney, Agent, or Firm*—Walter Ottesen

[57] ABSTRACT

The invention is directed to a method for controlling the gear-shifting comfort in motor vehicles having automatic transmissions. The method provides for pressure controllers for controlling clutches affecting the gear-shifting operations of the transmission. The preset values for the torque and/or the torque curves of the clutches are stored in dependence upon the particular gear-shifting operations and the transmission rpms in a characteristic field. The actual acceleration of the motor vehicle is detected with the aid of an acceleration sensor and a very low desired acceleration is used as a guide quantity for the torque control at the clutches. The preset values for the clutches corrected by this control are stored in the characteristic field.

12 Claims, 2 Drawing Sheets

METHOD FOR CONTROLLING THE SHIFTING COMFORT IN MOTOR VEHICLES HAVING AN AUTOMATIC TRANSMISSION

BACKGROUND OF THE INVENTION

It has always been a requirement to improve the gear-shifting comfort with respect to automatic transmissions. More specifically, it has been a requirement to reduce the jolts occurring during gear shifting. For example, U.S. patent application Ser. No. 08/050,085, filed Apr. 28, 1993, discloses a method for controlling the transmission wherein an output torque desired value is computed with this desired value being adjusted during gear shifting by an electronic motor power control.

Furthermore, the publication entitled "Bosch Technische Berichte", volume 7, book 4, (1983) pages 160 to 187, discloses various methods for controlling the transmission wherein the modulation pressure is controlled in a specific manner to increase the comfort of gear shifting and, additionally, an intervention on the motor for controlling the motor torque is carried out. The control values for the clutch torques or the pressure for the clutches in the transmission as well as for the intervention on the motor are usually stored in a characteristic field with such characteristic values being assigned to each gear shifting operation in dependence upon the particular rpm. In order to obtain these characteristic values, complex measurements are necessary during the adjustment phase in a motor vehicle provided with such a transmission.

A technician must vary the parameters influencing gear-shifting comfort when carrying out gear-shifting operations until optimal, relationships are present for each gear-shifting operation at each rpm or speed value. The configuration of a characteristic field of this kind is therefore complex and expensive. Even when optimal relationships are present in the test motor vehicle, significant differences in gear-shifting comfort for individual production motor vehicles occur because of variations in individual ones of the clutches, pressure controllers, valves and the like because, for obvious reasons, it is not possible to perform an adjustment of this kind for each individual motor vehicle. Furthermore, the gear-shifting comfort is affected by deterioration and, for motor vehicles having longer service times, by wear of the clutches, valve wear, seal wear and the like so that a reduction in comfort must be accepted since the transmission cannot be opened frequently for reasons of cost.

SUMMARY OF THE INVENTION

The method of the invention affords the advantage that the configuration of the characteristic field for optimal gear-shifting comfort takes place automatically in the adjustment phase so that even less qualified technicians can be entrusted to carry out this adjustment. The motor vehicle must only be driven over a certain path with as many gear-shifting operations as possible and at different rpms with the gear-shifting comfort being improved for each gear-shifting operation. Even if for an adjustment phase which is too short, improvements of the gear-shifting comfort were still possible, the adaptations required for this purpose are made automatically during driving by the later operator of the motor vehicle. A further essential advantage is seen in that long-term changes and deteriorations of component parts, which can lead to a deterioration of the driving comfort, are compensated automatically as long as this is still possible by the following: changes of clutch pressures, the time-dependent control of the shifting sequences and a changed intervention on the motor. The system thereby defines a self-learning system. A further advantage is that only a simple acceleration sensor is required for detecting the gear-shifting comfort because the gear-shifting comfort is detected via the accelerations or decelerations of the overall motor vehicle during gear shifting.

The preset values for the torque and/or torque curves of the clutches are advantageously present as pressure desired values for pressure controllers for adjusting the clutch pressures and especially in the form of pressure-change values and/or values for the holding times and/or slip times of the clutches. In addition, this acceleration control advantageously operates on the motor torque of the motor of the motor vehicle with corrected preset values for the motor torque likewise being stored in the characteristic field.

The different preset values stored in the characteristic field are reduced or increased in a pregiven sequence with a control deviation in accordance with pregiven control criteria. This can be carried out in the manner of a fuzzy control.

The very small desired acceleration values as guide quantities can be constant in the simplest case. However, these quantities are advantageously fixed in dependence upon the speed and especially in dependence upon the tractive resistance torque dependent upon the speed. These desired acceleration values are also advantageously stored in a characteristic field. These values can however also be computed in dependence upon measured speed values.

The acceleration sensor is preferably mounted in the area of the driver because, most of all, the acceleration performance of the motor vehicle in the area of the driver is determinative for the noticeable driving comfort.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
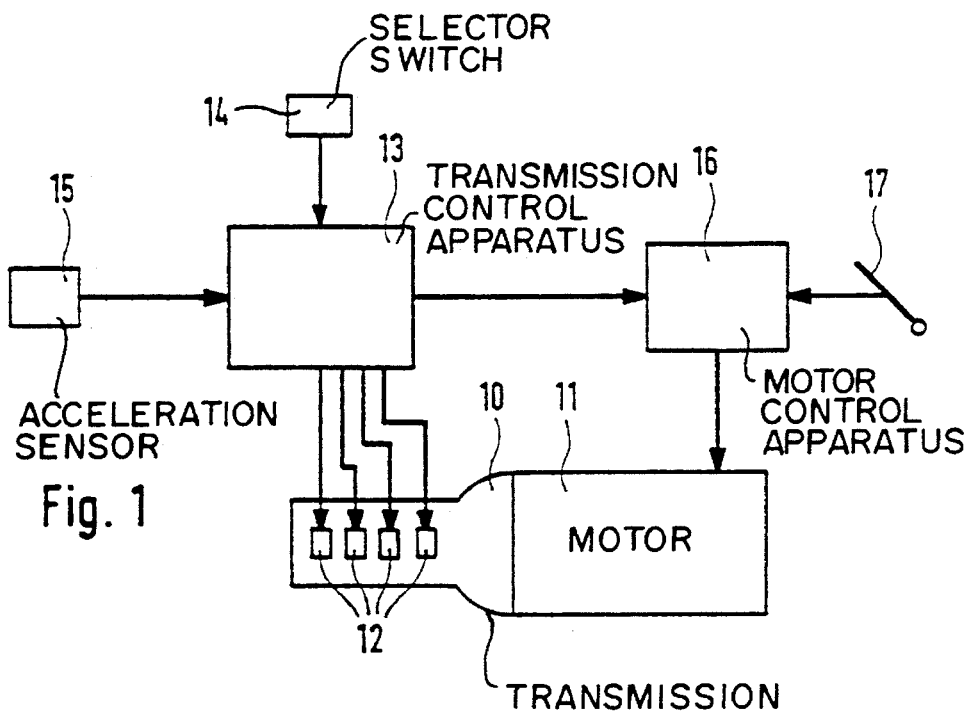
FIG. 1 is a schematic block diagram of a transmission control with intervention on the motor.

FIG. 1 shows an automatic stepped transmission 10 which is connected to a motor 11 of a motor vehicle (not shown). The motor is usually a diesel engine or a spark-ignition engine but, in principle, the invention is also realizable with an electric motor. In the transmission 10, pressure controllers 12 are arranged which effect the switchover between the different gears by means valves and clutches which are not shown. This is described in the publications referred to above which are part of the state of the art. Basically, only a single pressure controller 12 can control the gear-shifting operations via the valves and clutches.

The transmission and the pressure controllers 12 and the valves are controlled by an electronic transmission control apparatus 13 in a manner known per se. A selector switch 14 operates on the transmission control apparatus 13 for different transmission settings such as: reverse setting, low-gear setting, normal forward drive and the like. Furthermore, an acceleration sensor 15 mounted in the region of the driver or front passenger is connected to the transmission control apparatus 13 and supplies the apparatus 13 with signals corresponding to the acceleration or deceleration which is detected.

The motor 11 is configured as an internal combustion engine and is controlled in a manner known per se via an electronic engine control apparatus 16 for the characteristic field control of the ignition and/or fuel injection operations. An accelerator pedal 17 actuated by the foot of the driver operates on this motor control apparatus 16 to preset the engine torque. The transmission control apparatus 13 also operates on the engine control apparatus 16 to influence the motor torque during gear-shifting operations.

To carry out a gear-shifting operation, an engaged clutch, which is assigned to a gear into which the transmission has been shifted, is disengaged and another clutch is engaged essentially at the same time. The other clutch is assigned to a gear into which the transmission is to be shifted. In this way, the torque transmitted until now by the first clutch to a first transmission train is now transmitted by the second clutch to a second transmission train which is assigned to the new gear into which the transmission has been shifted. The actuation of the clutches takes place via the pressure controllers 12 and valves which are actuated via a program control by the transmission control apparatus 13.

Figure 2:
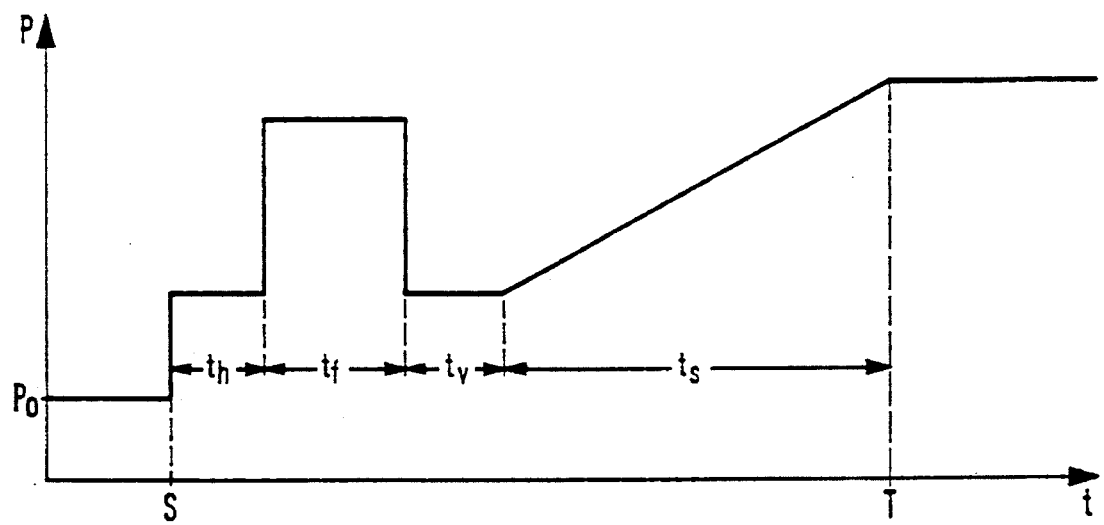
FIG. 2 is a typical pressure curve of a clutch in the transmission during a gear-shifting operation; and, FIG. 3 is a schematic representation of the control loop for optimizing gear-shifting comfort.

A typical pressure curve for a clutch to be engaged is shown in FIG. 2. The clutch is first charged with a very slight base pressure $P_o$ in the disengaged state. When a shift command S is received, which initiates the engagement of this clutch, the pressure is first raised to a higher defined level during a holding time $t_h$. Then, during a charging time $t_l$, a relatively high pressure is applied which causes the two clutch discs to come together in mutual contact engagement. Then, a delay time $t_v$ follows which is dependent upon the particular control program and the disengagement of the other clutch. A slip time $t_s$ now begins during which the clutch pressure is continuously increased so that the transmitted torque likewise continuously increases. At time point T, the gear-shifting operation is completed, that is, this clutch is now tightly engaged to rotate without slippage and transmits the entire torque.

For a highest possible comfort during shifting (that is, to avoid a jolt when shifting gears by changing the transmission output torque), the slippage, deceleration and holding times as well as the various pressures of the pressure controller can be varied which act on the particular clutch. This variation also affects the times and pressures of the other clutch which is disengaged. The optimal selection of these times and pressures is dependent upon the particular driving speed or upon the rpm of the engine 11 so that a plurality of corresponding preset values for the times and the pressures must be stored in a characteristic field which is contained in the transmission control apparatus 13.

Figure 3:
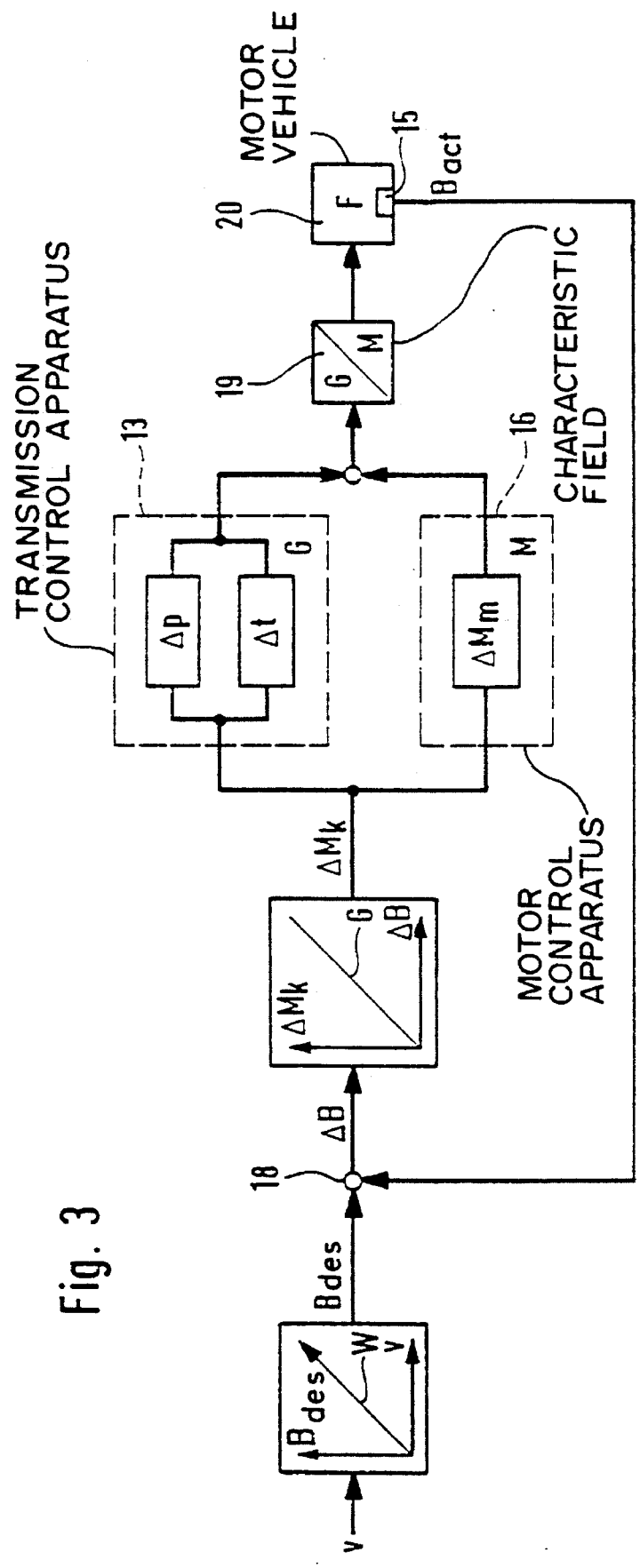

The transmission control apparatus 13 includes a microcomputer for controlling the gear-shifting operations as is described in greater detail in the state of the art referred to above. In the present embodiment, this microcomputer is configured as a control loop as shown in FIG. 3. A very low acceleration desired value $B_{des}$ is pregiven for the gear-shifting operations which is perceived by the driver or motor vehicle passengers as only a slight jolt and thereby determines the gear-shifting comfort. The particular acceleration desired value is dependent upon the tractive-resistance torque W and therefore on the road speed v of the motor vehicle. The particular acceleration desired values $B_{des}$ are determined with a pregiven function utilizing the speed signal v which in any event is detected in the motor vehicle. This function can be a linear function in the simplest case. This acceleration desired value can also be a constant for the simplest applications.

The acceleration desired value $B_{des}$ is compared to the acceleration actual value $B_{act}$ at a comparison point 18 with the acceleration actual value $B_{act}$ being detected by the acceleration sensor 15. If a jolt occurs, then this comparison leads to a control deviation $\Delta B$. This gear-shifting jolt $\Delta B$ exceeds the desired value and is in functional relationship via the transmission gear G with the corresponding clutch torque $\Delta M_k$ of the particular transmission clutch. The transmission gear G is the particular gear into which the transmission has been shifted and the clutch torque $\Delta M_k$ is to be correspondingly reduced. This functional relationship is stored in the microcomputer.

An intervention via the transmission control apparatus 13 and the engine control apparatus 16 is provided to reduce the clutch torque by this value $\Delta M_k$ as described above. The clutch pressure presently stored in the characteristic field can be changed by the value $\Delta P$ and the stored time (charging time, holding time, acceleration time and/or slippage time) can be changed by the value $\Delta T$ by the transmission control apparatus 13. The instantaneous pregiven engine torque is changed by the value $\Delta M_m$ by the engine control apparatus 16. The values stored up until now in the characteristic field 19 are changed by the corrective values so that now new preset values are available for the transmission control apparatus 13 and the engine control apparatus 16. For the purpose of clarity, only a single characteristic field 19 is shown schematically; however, separate characteristic fields are usually provided in the engine control apparatus and in the transmission control apparatus. The values corrected in the characteristic field 19 operate on the transmission and the engine in the next gear-shifting operation; that is, on the motor vehicle 20. The acceleration sensor 15 again registers a jolt which is compared to the corresponding desired value at the comparison point 18. If the jolt registered now is less than the desired value then the characteristic field values are maintained; otherwise, a new correction takes place.

The described control loop is continuously effective, that is, the quantities influencing gear-shifting comfort are continuously corrected when a jolt is registered which is greater than the desired value $B_{des}$. This control method is utilized in the adaptation of a new transmission; however, it can also be further effective after the motor vehicle is delivered so that long-term changes and the effects of deterioration can always be automatically compensated; that is, until the physical conditions come up against limit values. For example, a clutch pressure can no longer be increased as desired when, for example, a clutch is worn or defective. The engine torque can then also not be correspondingly changed as desired.

The torque difference $\Delta M_k$ which is to be compensated for the particular clutch can be determined via a pregiven function or via a characteristic field in dependence upon the particular transmission gear or the value $\Delta B$. The same applies to the determination of the desired value $B_{des}$. The intervention on the transmission control apparatus 13 and the engine control apparatus 16 for adapting the gear-shifting comfort can take place with more complexity or less complexity. In a simpler embodiment, only the clutch pressure and the slippage time are adaptively changed for example; whereas, for a more complex version, also other pressure values such as the charging pressure and holding pressure as well as other times such as holding times, charging times and delay times can be varied. The intervention on the engine can be configured to be more or less complex with such an intervention on the engine being described in greater detail in the state of the art referred to above. The change of the characteristic field values can be undertaken pursuant to pregiven functions and/or in a pregiven sequence. The use of a control in accordance with a fuzzy controller is also possible.

It is understood that the foregoing description is that of the preferred embodiments of the invention and that various changes and modifications may be made thereto without departing from the spirit and scope of the invention as defined in the appended claims.

What is claimed is:

1. A method for controlling the gear-shifting comfort in a motor vehicle having an automatic transmission, the automatic transmission having pressure controllers for controlling clutches effecting the gear-shifting operations of the transmission, the clutches transmitting torques and defining torque curves, the method comprising the steps of:

storing preset values for the torques and/or torque curves for said clutches in a characteristic field in dependence upon the particular gear-shifting operations and the magnitudes of a particular driving speed and/or rpm of the engine;

detecting the actual acceleration $B_{act}$ of the motor vehicle by utilizing an acceleration sensor;

providing a desired acceleration $B_{des}$ as a guide quantity for torque control of said clutches to obtain corrected preset values for said clutches; and, storing said corrected preset values for said clutches in said characteristic field.

2. The method of claim 1, further comprising the step of providing said preset values for said torques and/or said torque curves as pressure desired values for said pressure controllers.

3. The method of claim 2, further comprising the step of providing said preset values in the form of pressure change values and/or values for holding and/or slippage times of the clutches.

4. The method of claim 3, wherein acceleration of the motor vehicle is controlled and the method further comprising the steps of:

causing the acceleration control to additionally act on the motor torque of the motor vehicle; and, storing corrected preset values for the motor torque in said characteristic field.

5. The method of claim 4, further comprising the step of continuously using said method in a motor vehicle as a self-learning system to adapt for deterioration and for differences in components as a consequence of variations in manufacturing tolerances.

6. The method of claim 1, further comprising the step of determining said very low desired acceleration values $B_{des}$ in dependence upon the speed (v) of the motor vehicle.

7. The method of claim 6, further comprising the step of determining said desired acceleration values in dependence upon the tractive force torque W which is dependent upon said speed (v).

8. The method of claim 7, further comprising the step of storing said desired acceleration values $B_{des}$ in a characteristic field.

9. The method of claim 7, further comprising the step of computing said desired acceleration values $B_{des}$ in dependence upon measured speed values.

10. The method of claim 7, further comprising the step of mounting the acceleration sensor in the region of the driver of the motor vehicle.

11. The method of claim 7, further comprising the step of converting a control deviation present as an acceleration difference $\Delta B$ into a clutch torque difference $\Delta M_k$ with a characteristic field in dependence upon the particular gear G into which the transmission has been shifted.

12. The method of claim 7, further comprising the step of converting a control deviation present as an acceleration difference $\Delta B$ into a clutch torque difference $\Delta M_k$ with a functional relationship in dependence upon the particular gear G into which the transmission has been shifted.

* * * * *